United States Patent
Kitamura et al.

(10) Patent No.: US 9,528,031 B2
(45) Date of Patent: Dec. 27, 2016

(54) SLURRY COMPOSITION AND METHOD OF SUBSTRATE POLISHING

(71) Applicant: Nihon Cabot Microelectronics K.K., Tsu-shi (JP)

(72) Inventors: Hiroshi Kitamura, Tsu (JP); Tsuyoshi Masuda, Tsu (JP); Yoshiyuki Matsumura, Tsu (JP)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 14/784,527

(22) PCT Filed: Apr. 25, 2014

(86) PCT No.: PCT/IB2014/000703
§ 371 (c)(1),
(2) Date: Oct. 14, 2015

(87) PCT Pub. No.: WO2014/174365
PCT Pub. Date: Oct. 30, 2014

(65) Prior Publication Data
US 2016/0068713 A1 Mar. 10, 2016

(30) Foreign Application Priority Data

Apr. 25, 2013 (JP) .................................. 2013-092253

(51) Int. Cl.
*C09K 13/00* (2006.01)
*C09G 1/04* (2006.01)
*C09G 1/00* (2006.01)

(52) U.S. Cl.
CPC .. *C09G 1/04* (2013.01); *C09G 1/00* (2013.01)

(58) Field of Classification Search
CPC ....... C09K 3/1409; C09K 3/1463; C09G 1/00; C09G 1/02; C09G 1/04
(Continued)

(56) References Cited

U.S. PATENT DOCUMENTS

| 5,571,373 | A | 11/1996 | Krishna et al. |
| 6,099,604 | A | 8/2000 | Sandhu et al. |

(Continued)

FOREIGN PATENT DOCUMENTS

| CN | 101153206 A | 4/2008 |
| EP | 1205965 A1 | 5/2002 |

(Continued)

OTHER PUBLICATIONS

European Patent Office, International Search Report issued in connection with Application No. PCT/IB2014/000703 on Oct. 24, 2014.

*Primary Examiner* — Roberts Culbert
(74) *Attorney, Agent, or Firm* — Thomas Omholt

(57) ABSTRACT

Slurry composition and a method of substrate polishing used in chemical mechanical polishing (CMP). The present invention concerns a slurry composition containing a polishing agent and a water soluble polymer. The slurry composition contains a water soluble polymer that has a solubility parameter in the range of 9.0 to 14.0 and that may contain hetero atoms at a level sufficient to lower the polishing rate near the edges of the polished substrate defined as the region within 1 mm of the outer edge of the polished substrate to a level below the mean polishing rate of the polished substrate. The water soluble polymer may have a mean molecular weight in the range of 200 to about 3,000,000, and the mean molecular weight may be in the range of 200 to 110,000 if hetero atoms are present in the main-chain structure and the SP value is under 9.5.

13 Claims, 5 Drawing Sheets

(58) Field of Classification Search
USPC ......................................................... 252/79.1
See application file for complete search history.

(56) References Cited

U.S. PATENT DOCUMENTS

| | | |
|---|---|---|
| 6,626,968 B2 | 9/2003 | Park et al. |
| 7,687,393 B2 | 3/2010 | Iwasa |
| 8,366,959 B2 * | 2/2013 | Babu ........................ C09G 1/02 |
| | | 252/79.1 |
| 2004/0055223 A1 | 3/2004 | Ono et al. |
| 2007/0051917 A1 | 3/2007 | Thomas et al. |

FOREIGN PATENT DOCUMENTS

| | | |
|---|---|---|
| EP | 2075824 A1 | 7/2009 |
| JP | 2005303060 A | 10/2005 |
| WO | 02081584 A1 | 10/2002 |
| WO | 2010127938 A1 | 11/2010 |

\* cited by examiner (a)

(b)

Key
1) Relative ROA
2) Mean Molecular Weight

SLURRY COMPOSITION AND METHOD OF SUBSTRATE POLISHING

The present invention concerns semiconductor substrate polishing technology. Specifically, it concerns a slurry, or chemical-mechanical polishing, composition and a method of substrate polishing used in chemical mechanical polishing (CMP).

Silicon wafers that constitute the semiconductor substrate used in the manufacture of semiconductor substrates are subjected to various types of photolithography, deposition processing, polishing processing, and the like, and are utilized in order to provide semiconductor equipment. Silicon wafers are subjected to many steps in order to construct semiconductor equipment, and since improvement in the yield of semiconductor devices is demanded, rigorous demands are placed on surface quality. Chemical mechanical polishing technology has been utilized in the past in order to ensure surface quality through mirror-surface polishing of silicon wafers.

In primary polishing of silicon wafers, CMP generally retains silicon wafers on a carrier in order to fix them in place. The silicon wafers are then wedged between an upper and lower disc affixed with a polishing cloth containing a synthetic resin foam and a synthetic leather such as suede and the like. Then, polishing is carried out under compression and rotation while an aqueous composition with dispersed colloidal particles such as silica, alumina, ceria, zirconia, and the like (hereinafter referenced as a slurry composition) is provided.

Enhanced productivity and surface quality have been increasingly called for in CMP of silicon wafers accompanying recent increases in demand, higher performance and higher integration density of semiconductor devices. Topics cited in this regard include enhanced polishing speed, reduced surface roughness and haze, enhanced evenness (roll-off, SFQR, ESFQR), and reduced scratching.

In particular, silicon wafers have increased in size in recent years, and the roll-off of the outer edges of silicon wafers has been energetically inhibited in order to enhance the yield of chips from a single silicon wafer, and enhancement in the surface flatness as well as reduction in the width of edge exclusion have been sought. The separation between silicon wafers and the carriers could be adjusted, for example, in order to reduce edge exclusion. Another proposal would be a polishing method in which a polishing pad is protruded outward from the outermost edge of the effective working surface.

Slurry compositions have been examined in order to improve roll-off. For example, in order to improve the roll-off in polishing of substrates used in memory hard discs, a slurry composition containing water, polyoxyethylene polyoxypropylene alkyl ether and polyoxyethylene polyoxypropylene block copolymer is referred to in unexamined patent application publication 2002-167575 (Patent Document 1).

A slurry composition containing a polishing agent, water and organic acids or their salts with specific viscosity of 1.0 to 2.0 mPa·s at 25° C. and shear rate of 1500 $S^{-1}$ to reduce substrate roll-off is referred to in unexamined patent application publication 2004-91674 (Patent Document 2).

Furthermore, unexamined patent application publication 2009-231486 (Patent Document 3) presents a slurry composition that contains silica particles A having a mean primary particle diameter of 10 to 50 nm, silica particles B, a water soluble polymer and basic compounds in which the degree of association of the aforementioned silica particles A is 1.8 to 2.5, the degree of association of the aforementioned silica particles B is 1.0 to 2.5, and in which the particle diameter ratio of the aforementioned silica particles A to the aforementioned silica particles B (mean primary particle diameter of the aforementioned silica particles A/mean primary particle diameter of the aforementioned silica particles B) is 1.2 to 4.5.

Patent application publication 2011-9737 (Patent Document 4) proposes a polishing pad and polishing method to improve roll-off of the edge region.

While various types of slurry compositions and polishing methods have been proposed, as noted above, further reductions in product cost and yield enhancement through roll-off improvements have been sought in silicon-wafer mirror polishing techniques.

In light of the aforementioned problems with the prior art, the present invention provides a (slurry) composition, and a method of silicon wafer polishing, e.g. capable of improving the flatness (roll-off, etc.) near or at the edge of a silicon wafer, such as in silicon wafer polishing.

The results of examinations by the inventors into slurry compositions used for mirror polishing of silicon wafers revealed a water soluble polymer, with specific properties, that can make it easier to selectively interpose near the edges. This may have little or no effect on the FQA (Fixed Quality Area) of a silicon wafer (usually defined as regions excluding regions of edge exclusion). The characteristics can improve the roll-off of silicon wafers and/or the flatness near the edges.

Silicon wafers are subjected to polishing through the imposition of pressure via a polishing pad during polishing treatment of wafers. At this time, silicon wafers may be pushed inwardly slightly due to compressive force from the polishing pad due to having a finite modulus of elasticity, and the pressure tends to rise near the edges. The inventors discovered that the concentration of stress at the edges of silicon wafers that develops at this time can be a factor leading to roll-off, and that discovery culminated in the present invention.

A water soluble polymer, e.g. that can protect a silicon wafer surface adhering to a surface near the edge of a silicon wafer, can thus be included in a (slurry) composition of the present invention. The inclusion of hetero elements or atoms (e.g. nitrogen and/or oxygen), such as in the main chain framework and/or in the side chain of the water soluble polymer, is preferred. The polymer may adhere to the hydrophobic surface of silicon during polishing and/or may obstruct polishing, e.g. by polishing particles, such as colloidal silica.

The slurry or chemical-mechanical polishing composition of the present invention may improve the ROA (Roll-Off-Amount or (edge) roll-off aspect), such as by selectively lowering the polishing rate, e.g. near the silicon wafer edge, below the mean overall polishing rate of the silicon wafer. The preferred water soluble polymer used in the present invention preferably has a solubility parameter (SP) value (in the range of) from 9.0 to 14.0 and/or a mean molecular weight (in the range of) from about 200 to approximately 3,000,000.

When one or more hetero atoms are used or contained (in the main chain structure), e.g. with an SP (solubility parameter) value of the water soluble polymer below 9.5, the molecular weight of the water soluble polymer is preferably a mean molecular weight (in the range of) from 200 to 110,000 or less, e.g. from the perspective of roll-off improvement.

From the perspective of enhanced stability, the mean molecular weight can be suitably (in the range of) from 1,000 to 60,000. A range of from 1,000 to 40,000 may be desirable, e.g. from the perspective of improved roll-off stability.

The SP value should be from 12 to 13.9, e.g. when a water soluble polymer lacking any hetero atoms (in the main chain structure) is used in the present invention, which may be desirable to realize good ROA (edge roll-off aspect or area) improvements.

The present invention provides a (slurry or chemical-mechanical polishing) composition comprising or containing a polishing agent and a water soluble polymer. The water soluble polymer can have a solubility parameter (SP) in the range of 9.0 to 14.0. The polymer may contain (one or more) hetero atom(s) and/or may be (at a level sufficient) to lower the polishing rate near the or an edge(s) of a polished substrate below the mean polishing rate of the polished substrate.

The water soluble polymer preferably has a (mean) molecular weight in the range of about 200 or 1,000 or 2,000 up to about 10,000, 100,000 or 3,000,000. The mean molecular weight of the polymer may be in the range of 200 to 110,000, e.g. when the polymer contains hetero atoms, such as in the main-chain structure and/or with an SP value under 9.5. The water soluble polymer may contain (one or more) hetero atom(s), such as N and/or O) in the side chain, main chain, and/or in both chains.

The content of the water soluble polymer in the present invention or composition can be in the range of 1 ppm to 1,000 ppm, preferably 1 ppm to 600 ppm, more preferably the range of 1 ppm to 400 ppm, and most preferably the range of 1 ppm to 200 ppm. The amount of the water soluble polymer may not be more than 200 ppm, e.g. if the water soluble polymer has the aforementioned solubility parameter of 12 to 13.9.

The water soluble polymer suitably comprises poly-N-vinylpyrrolidone, poly-N-vinyl acetamide, poly-N-methyl-vinyl acetamide, PEG and/or PEO, such as having a mean molecular weight in the range of 200 to 110,000, PEO-PPO copolymers, poly-2-ethyloxazoline, or a mixture thereof. The material or substrate to be polished, or for use with for the (slurry) composition suitably comprises a silicon wafer. The pH can be in the range of 7 to 12.

The present invention also provides a method of (substrate) polishing, the method comprising polishing a substrate (such as a silicon substrate, e.g film or wafer) with the composition of the invention. Preferably the method comprises;

adhesion (or adhering) to a polished substrate a (slurry) composition comprising a water soluble polymer, that may have a solubility parameter in the range of 9.0 to 14.0 and/or that contains hetero atoms, such as at a level sufficient to lower the polishing rate near the edges of the polished substrate (defined as the region within 1 mm of the outer edge of the polished substrate) suitably to a level below the mean polishing rate of the polished substrate; and polishing the (polished) substrate, e.g. using a polishing pad, with the slurry composition.

The water soluble polymer may have a mean molecular weight in the range of 200 to about 3,000,000, and the content of the water soluble polymer may be in the range of 1 ppm to 1000 ppm. The mean molecular weight of the water soluble polymer is preferably in the range of 200 to 110,000 if hetero atoms are present in the main-chain structure and the SP value is under 9.5. The water soluble polymer may contain hetero atoms in the side chain.

The present invention can thus provide a slurry composition, for wafer polishing, and a method of silicon wafer polishing, capable of improving roll-off without damaging the polishing rate of silicon wafers in mirror-surface polishing of silicon wafers. The invention also extends to a substrate polished by a composition or method of the invention. Preferred features and characteristics of one aspect of the invention are applicable to another mutatis mutandis.

The present invention is explained below according to the embodiments. However, the present invention is not restricted to these embodiments.

CMP Apparatus and Polishing Conditions

Figure 1:
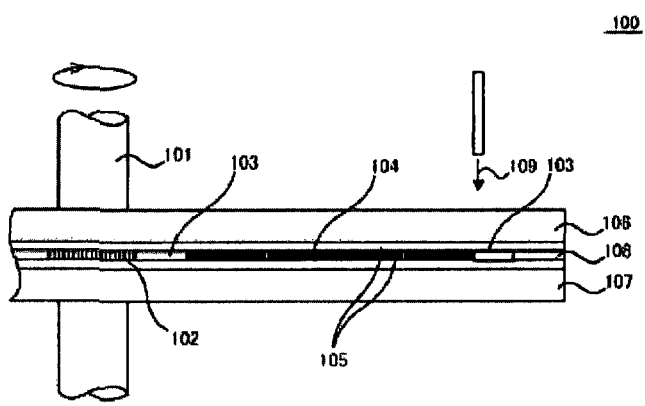
FIG. 1 is a schematic view of the CMP apparatus used in the invention.

FIG. 1 provides a schematic of the CMP apparatus used in this embodiment. A CMP apparatus 100 shown in FIG. 1 carries out polishing of both surfaces for the purpose of explanation, but in the present invention, it is applied to polishing of one surface as well. The CMP apparatus 100 is usually capable of polishing a plurality of silicon wafers at once from the perspective of productivity. A silicon wafer 104 is sandwiched between polishing pads 105 that are affixed to discs 106, 107 that are deployed above and below.

The silicon wafer 104 is attached to carriers 103 that are deployed on the inside and outside. The silicon wafer 104 and each polishing pad 105 are moved relatively accompanying rotation of the upper and lower discs 106, 107 as well as rotation of a sun gear 102 and an internal gear 108, and mirror-surface polishing of each silicon wafer 104 is carried out. A slurry composition 109 is supplied to each polishing pad 105 from an appropriate position between the upper and lower surfaces of each polishing pad 105 and the silicon wafer 104 in the conduct of polishing.

Excluding those cases in which chemical reactions must be considered, the polishing rate (RR) of silicon wafers can be expressed by the Preston equation presented in equation 1 below.

Equation 1

$$RR = \frac{Q}{t} = k \times p \times V \tag{1}$$

In the aforementioned equation, RR represents the polishing rate, Q represents the polishing amount, t represents the polishing time, k represents the proportionality constant, p represents the pressure on the silicon wafer surface (surface pressure), and V represents the relative speeds of the silicon wafer surface and the polishing pad. As is evident from the aforementioned equation, the surface pressure distribution is not uniform since the polishing rate RR is proportional to the surface pressure. The surface pressure near the edge of the silicon wafer especially tends to become greater compared to the wafer center. As a result, the polishing rate near the edge region becomes relatively large, and this is considered to be a cause of roll-off. Various methods of evaluating the aforementioned roll-off are available, and FIG. 2 presents the most extensively acknowledged method of evaluating the ROA (Roll-Off-Amount).

Figure 2:
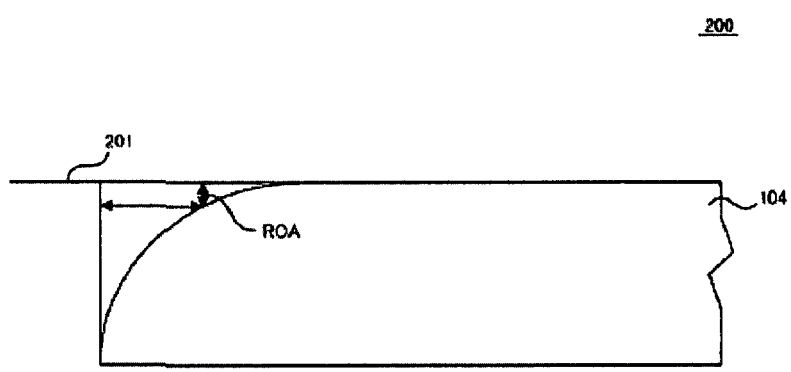
FIG. 2 is a diagram showing an enlargement of the edge vicinity of silicon wafer 104.

FIG. 2 is a diagram showing an enlargement of the edge vicinity of the silicon wafer 104. A base line 201 is extended along the upper surface of the silicon wafer 104. ROA can be defined as the distance from the base line 201 to the outer surface of the silicon wafer 104 at 1 mm inside measured from the outer edge of the silicon wafer 104. ROA varies depending on various conditions, but in many cases, its value is in the range of 1000 D to 10,000 D. If such a roll-off is present, the effective usable area of the silicon wafer 104 would decrease from the perspective of surface shape and the product yield would be adversely affected, which would be undesirable. Inhibition of roll-off is required in light of recent high degrees of integration.

In consideration of process applicability, various polishing conditions are set in the polishing method that uses the CMP apparatus 100 shown in FIG. 1. In this embodiment, the apparatus may employ conditions such as polishing pressure of 2 psi=140 kPa to 10 psi=700 kPa, table speed of 10 to 50 rpm, carrier speed of 10 to 30 rpm, slurry feed rate of 100 to 300 mL/min, and polishing duration of 15 min. These process conditions can be altered as a function of the apparatus environment and material environment that is appropriately employed in response to specific objectives. The individual values presented above are merely illustrative.

The fact that the cause of roll-off onset is uneven surface pressure near the edge of the silicon wafer 104 is as noted above. However, the polishing mechanism near the edge of the silicon wafer 104 is thought to be more complicated.

Figure 3:
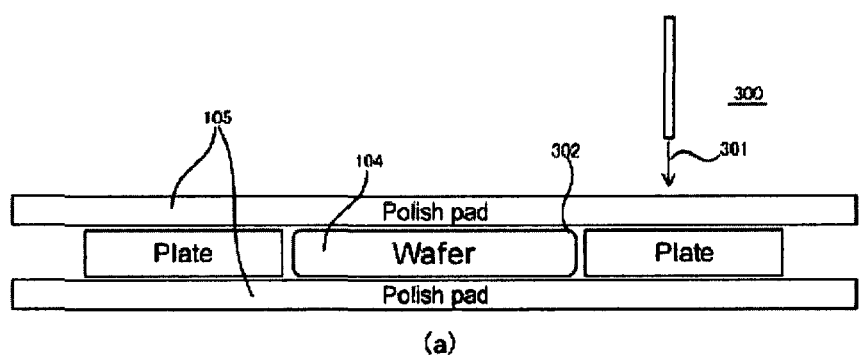
FIG. 3 is a conceptual diagram showing the relationship of material near the edge during the wafer polishing processing of silicon wafer 104.
Figure 3:
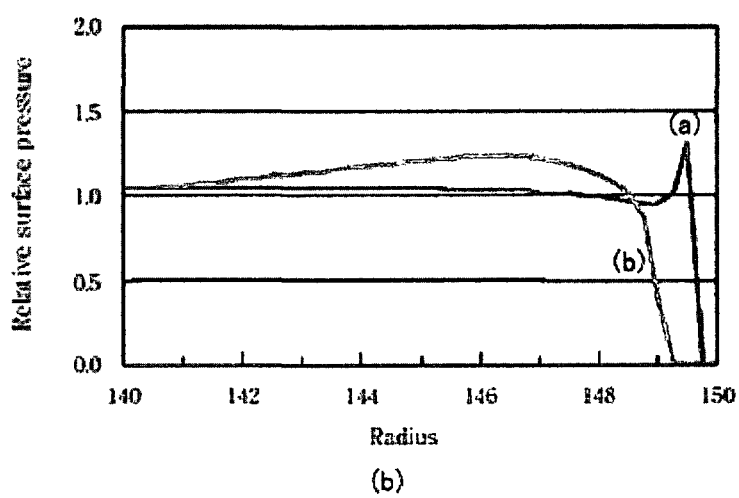

FIG. 3 is a conceptual diagram showing the relationship of material near the edge during the wafer polishing processing of the silicon wafer 104. As shown in FIG. 3a, the silicon wafer 104 is polished by a slurry composition 301 that is supplied between each polishing pad 105 and the silicon wafer 104 during the wafer polishing process. The CMP slurry that overflows from the boundaries is held by surface tension and the like in the space between each polishing pad 105 and the edge of the silicon wafer 104. Ultimately, it is discharged outside of the system. The slurry composition 301 is an aqueous solution containing polishing particles such as fumed silica, colloidal silica, colloidal alumina, ceria, zirconia, etc. The slurry composition 301 is supplied to the boundary between each polishing pad 105 and the silicon wafer 104 to complete polishing of the silicon wafer 104, and then reaches the edge section 302.

The following action develops at the edge section 302 from the microscopic perspective. The surface of the silicon wafer 104 is compressed by each polishing pad 105 at the edge section 302 of the silicon wafer 104. Slight deformation develops on the surface of the silicon wafer 104 due to its fine modulus of elasticity. Then, the surface of the silicon wafer 104 rebounds when the compressive force falls corresponding to rotation of the polishing pad 105, and the polishing pressure at the edge section 302 transiently increases. FIG. 3(b) presents this mechanism conceptually. FIG. 3b ("A. Fukuda, Journal of JSME vol. 72 "The Impact of Wafer Edge Roll-Off on CMP Performance", (2006).") is a diagram that presents changes in the relative surface pressure from the center toward the diameter of the silicon wafer 104 by showing show the surface pressure near the edge section 302 of the silicon wafer 104 changes when ROA is small (a) and when ROA is great (b). As shown in FIG. 3b, ROA is improved. Specifically, the tradeoffs are presented in that the relative surface pressure tends to increase abruptly near the edge section 302 of the silicon wafer 104 as ROA decreases. Consequently, even if ROA should decrease, the surface pressure near the edge section 302 of the silicon wafer 104 would increase accompanying ROA decrease. Conversely, the polishing speed would increase.

Slurry Composition

A polishing mechanism can be introduced in regions where roll-off develops under conditions of elevated edge pressure that differs from the polishing function at the center of the silicon wafer 104. The surface of the silicon wafer 104 maintains hydrophobicity in an environment in which polishing treatment is applied. For this reason, the roll-off characteristics could be improved if the surface near the edge could be protected by adding water soluble material that protects hydrophobic surfaces and provides abrasion resistance to a slurry composition. On the other hand, the slurry composition preferably would be a polymer compound that is an aqueous composition out of material demands in order to impart abrasion resistance, and it would also have affinity for the hydrophobic surface while maintaining adequate water solubility. The polishing rate near the edge of the silicon wafer 104 is formulated below.

The polishing rate RR relative to the entire silicon wafer 104 is given by the aforementioned equation (1), excluding surface pressure rise. In addition, the polishing rate near the edge relative to polymer compound polishing that is used would be $R_{ROA}$, the polishing rate near the edge when the surface pressure is high under conditions of polymer exclusion would be $RR_{edge}$, and the protection term of water soluble polymer against polishing would be $R_{pro}$. The term for molecular weight dependence at the interface of water soluble polymer would be $R_{rm}$. Under such circumstances, the effective polishing rate $R_{ROA}$ near the edge of the silicon wafer 104 would be given by the following equation (2). The term of molecular weight dependence would comprehensively include rheology-related effects such as the surface energy of water soluble polymers, the viscosity, adsorption at the interface and the like. The possibility is considered that the molecular weight of the water soluble polymer could adversely affect the polishing properties.

Equation 2

$$R_{ROA} = RR_{edge} + R_{pro} + R_{rm} \qquad (2)$$

$R_{pro}$ is a term of protection of the silicon wafer from polishing by polishing material. It is defined as a negative value that can formulate the probability of adsorption of water soluble polymer on the surface of the silicon wafer 104 that is hydrophobic. Concretely, the solubility parameter, an indicator of the hydrophobicity of the water soluble polymer, is adopted, and its reciprocal can serve as an indicator of hydrophobicity. Furthermore, when adsorption of water soluble polymer on the surface of the silicon wafer 104 conforms to the Langmuir adsorption equation, it is proportional to the addition level C of water soluble polymer in the slurry composition.

Consequently, $R_{pro} = -A \times C/SP$ (A is a constant). The SP (solubility parameter) value of the water soluble polymer uses the Fedors method as set forth by Ueda et al., Materials Research, No. 152, October 2010, pp. 41 to 46. The SP value of the water soluble polymer can be realized through the SP value of the monomer.

Moreover, $R_{rm}$ represents the effects of the chain length of the water soluble polymer on the polishing rate. It is a term that applies the surface energy dependent on the chain length of the water soluble polymer as well as the viscosity and the cohesion to the polishing rate. It can serve as an appropriate parameter for the molecular weight or the degree of polymerization. Consequently, the term of molecular weight dependence $R_{rm}$ could be rewritten as $B \times R$ (Mw) (B is a constant). As a result, the aforementioned equation (2) could be rewritten as follows.

$$R_{ROA} = RR_{edge} - A \times \frac{C}{SP} + B \times R(Mw) \quad (3)$$

Reducing the $R_{ROA}$ of the aforementioned equation (3) would be effective in order to improve the wafer ROA following polishing. The aforementioned equation (3) indicates that the addition of a water soluble polymer that has the smallest possible SP value to a slurry composition would be preferred if the addition level is constant. Thus, the inventors realized that the tradeoffs of the aforementioned conventional technology could be overcome by incorporation in a slurry composition of a water soluble polymer in which the term for protecting a silicon wafer by adhesion of a water soluble polymer {$A \times C/SP$} is made as large as possible and in which the molecular weight dependence term {$B \times R$ (Mw)} is made as small as possible.

Thus, water soluble polymer was added to the slurry composition and the relative polishing rate versus the addition level (RR upon addition of water soluble polymer/RR without addition of water soluble polymer) as well as the relative ROA (ROA upon addition of water soluble polymer/ROA without addition of water soluble polymer) were plotted. The behavior of the water soluble polymer at the edge boundary region was then examined.

Figure 4:
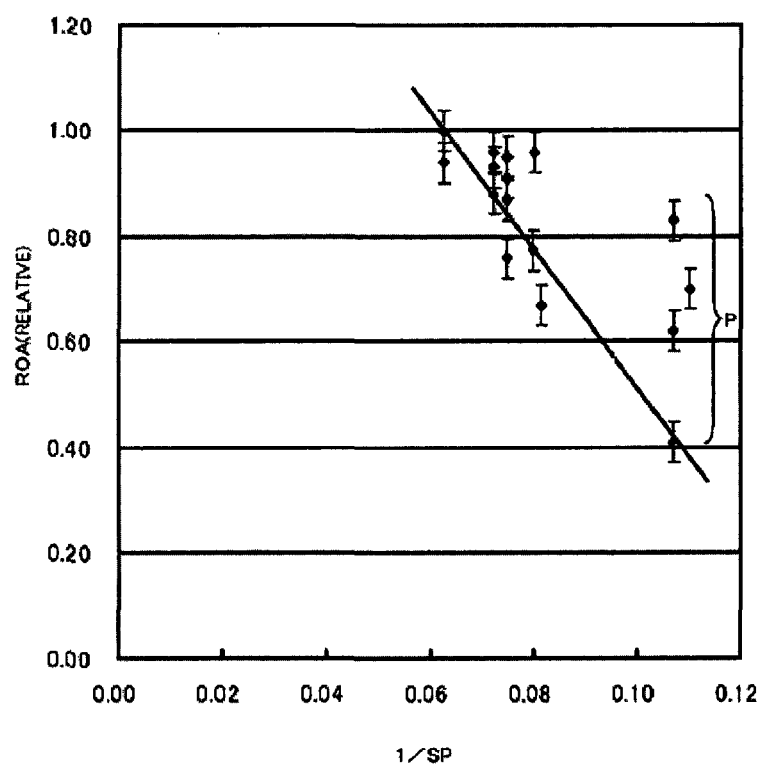
FIG. 4 is a diagram in which data at an addition level=200 ppm was extracted from the relative ROA data of each water soluble polymer and was plotted against 1/SP, with the results examining the relationships presented.

According to the aforementioned equation (3), the protection term $R_{pro}$ is dependent on the addition level (ppm) and on the solubility parameter SP. The molecular weight dependence term is dependent primarily on the molecular weight. Thus, among the relative ROA data of each water soluble polymer, the data of addition level=200 ppm was extracted and plotted against 1/SP, and the relation was examined. FIG. 4 presents the results. As shown in FIG. 4, the relative ROA when the addition level was constant was shown to be described by a generally linear relationship independently of the molecular weight. On the other hand, the water soluble polymer group P1 that has a small SP value (large 1/SP value) among the water soluble polymers exhibits great molecular weight dependence even at a constant addition level.

The water soluble polymer group P1 is a water soluble polymer that contains PEO, or PEO-PPO block copolymers. The water soluble polymer group P1 exhibits a different effect on the polishing mechanism at the edge boundary of the silicon wafer compared to other water soluble polymers. As for the protection term $R_{pro}$, the factor of the water soluble polymer group P1 that aggravates ROA is believed to be dependent on the molecular weight dependence term $R_{rm}$ since the addition level is uniform. The water soluble polymer with a PEO/PPO framework was clarified to provide different behavior from that of other water soluble polymers at the edge boundary. The water soluble polymer group P in FIG. 4 has a mean molecular weight of PEG 8000, PEO 60,000, PEO-PPG block copolymers mean molecular weight 14,500, PEO 1110,000 from small ROAs up.

There is no specific theoretical reason for this phenomenon, but the surface tension is known to increase as the molecular weight of PEO/PEG rises. (See alkylene oxide polymer, issued Jan. 20, 1990, Shikida ed., Kaibunsho Publishing, ISBN4-303-71800-9). This fact indicates that the surface energy rises with increase in the molecular weight as PEO/PEG becomes localized at the edge boundary region, and that the shearing force rises because of higher local viscosity at the edge boundary region. Thus, a tendency for ROA deterioration is surmised to arise. However, even the water soluble polymer group P1 can inhibit adverse effects on ROA because of a low mean molecular weight. The condition $\Delta ROA/RR \geq 1$ can be realized.

Figure 5:
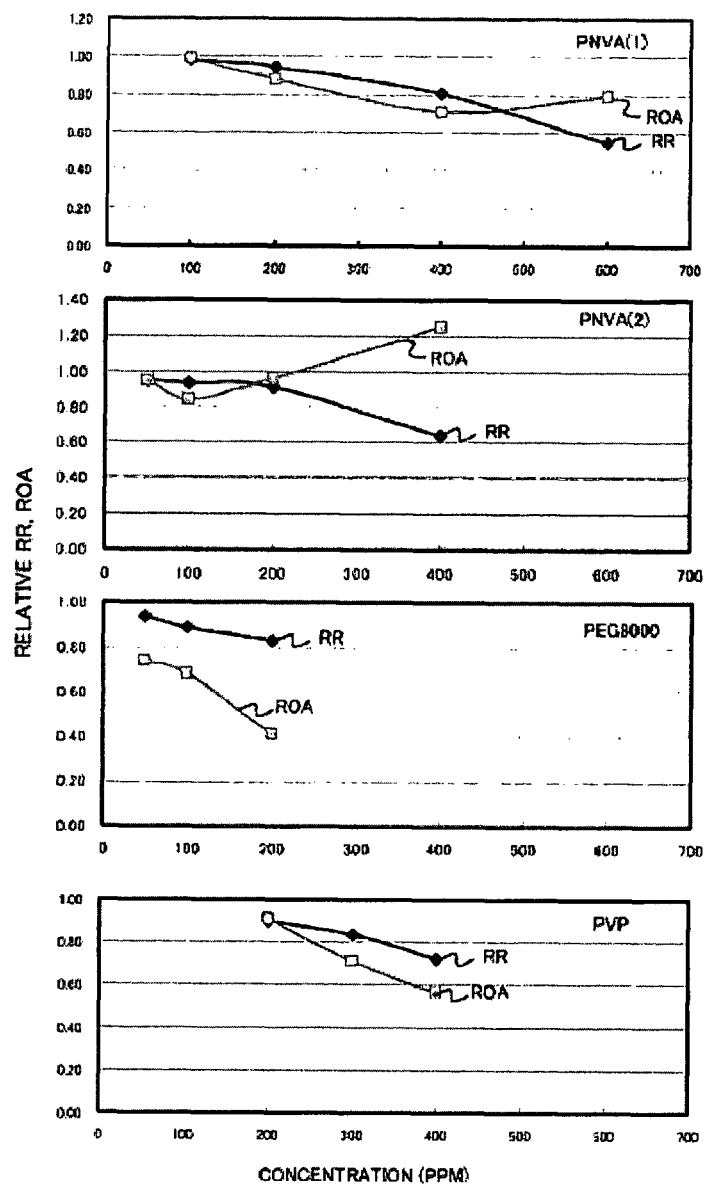
FIG. 5 is a diagram in which the polishing rate RR (relative value) and ROA (relative value) were plotted in a range of addition levels of water soluble polymer of 50 ppm to 600 ppm for three types of water soluble polymers.

FIG. 5 is a plot of the polishing rate RR (relative value) and ROA (relative value) for three types of water soluble polymers in sequence from above, poly-N-vinylacetamide (PNVA), GE-191-103 (PNVA (1)), GE-191-104 (PNVA (2)), PEG8000 and polyvinylpyrrolidone (PVP, molecular weight sequence from smallest of K15, K30, K60, K90, K120) in the range of addition levels of water soluble polymer of 50 ppm to 600 ppm. As indicated in FIG. 5, RR and ROA exhibit a tendency to decrease due to the addition of water soluble polymer even though the amount of change due to the water soluble polymer may vary.

However, the behavior of decline in ROA, specifically in roll-off when the polishing rate RR falls, varies significantly according to the water soluble polymer. Water soluble polymers that selectively lower the ROA have been found. Decrease in the polishing rate RR is concluded to be a decline in the polishing rate as a result of protection of the surface of the silicon wafer 104 by the protective term represented by $R_{pro}$ in the aforementioned equation (3). In addition, decrease in ROA is an effect of the molecular weight dependence term in addition to the protection term $R_{pro}$. This is believed to show the function of stronger protection of silicon wafers near the edge boundary depending on the type of water soluble polymer because of the presence of more water soluble polymer at the edge boundary during polishing than at the polishing surface above the silicon wafer and the polishing pad.

The adsorption of such water soluble polymers on silicon wafers was examined. The surface adhesion varies with the SP value since the surface of silicon wafers is hydrophobic during the polishing process. Water soluble polymers with a desirable range of SP values as a function of the hydrophobicity of the silicon wafer surface provide desirable wetting properties to the silicon wafer surface. As a result, the monomer segment efficiently bonds to silicon wafers.

The results of FIG. 4 and FIG. 5 indicate that the SP value of water soluble polymers calculated using the monomer framework in accordance with Fedors equation can be in the range of 9.0 to 14.0 in order to improve ROA. The molecular weight dependence would tend to be pronounced if hetero atoms are contained in the main-chain structure when the SP value is under 9.5 and the ROA tends to be adversely affected. Consequently, the molecular weight of water soluble polymers with hetero atoms in the main-chain structure with a SP value under 9.5 would usually be in the range of mean molecular weight of 200 to 110,000, preferably 1000 to 60,000, and most preferably a range of mean molecular weights of 1000 to 40,000, such as to derive a more stable ROA improvement. Water soluble polymers containing hetero atoms in the main-chain structure (and in which the SP value is under 9.5) are exemplified by PEG, PEO, or PEG-PEO (block) copolymers.

When water soluble polymers that do not contain hetero atoms in the main-chain structure, specifically vinyl-based polymers or acrylic-based polymers, are used, setting the SP value in the range of 12 to 13.9 would be preferred, since that would allow the ROA rather than the overall polishing rate to be selectively reduced. At this time, the affinity of water soluble polymers with silicon wafers is concluded approach the critical value near the upper limit of the SP value. Since the ROA is lowered depending on the addition level, an addition level under 1000 ppm, preferably under 600 ppm, more preferably under 400 ppm, and most preferably under 200 ppm would be preferred to minimize the possibility of affecting the slurry properties.

Preferred examples of water soluble polymers that can be used in the present invention include homopolymers or copolymers created through polymerization of vinyl monomers, typified by styrene, chlorostyrene, α-methylstyrene, divinyl benzene; vinyl carboxylates such as vinyl acetate, vinyl propionate, vinyl butyrate, vinyl octylate, vinyl caprate, vinyl laurate, vinyl myristate, vinyl stearate, vinyl adipate, vinyl(meth)acrylate, vinyl crotonate, vinyl sorbate, vinyl benzoate, vinyl cinnamate, and the like; acrylonitrile, limonene, cyclohexene; 2-vinyl pyridine, 3-vinyl pyridine, 4-vinyl pyridine, N-vinyl pyrrolidone; N-vinyl compounds such as N-vinyl acetamide, N-vinyl methyl acetamide; cyclic ether vinyl compounds such as vinylfuran, 2-vinyl oxytetrapyran; mono vinyl ethers such as methyl vinyl ether, ethyl vinyl ether, propyl vinyl ether, butyl vinyl ether, amyl vinyl ether, 2-ethylhexyl vinyl ether, octyl vinyl ether, nonyl vinyl ether, dodecyl vinyl ether, hexadecyl vinyl ether, octadecyl vinyl ether, butoxy ethylvinyl ether, cetyl vinyl ether, phenoxy ethylvinyl ether, allylvinyl ether, methallyl vinyl ether, glycidyl vinyl ether, 2-chloroethyl vinyl ether, cyclohexyl vinyl ether; homopolymers such as ethylene glycol monovinyl ether, polyethylene glycol monovinyl ether, propylene glycol monovinyl ether, polypropylene glycolmonovinyl ether, 1,3-butylene glycol monovinyl ether, tetramethylene glycol monovinyl ether, hexamethylene glycol monovinyl ether, neopentyl glycol monovinyl ether, trimethylol propane monovinyl ether, glycerin monovinyl ether, pentaerythritol monovinyl ether, 1,4-cyclohexane dimethanol monovinyl ether; desired combinations of copolymers, as well as water soluble polymers or copolymers. The degree of saponification may be adjusted to appropriately enhance the water solubility.

Figure 6:
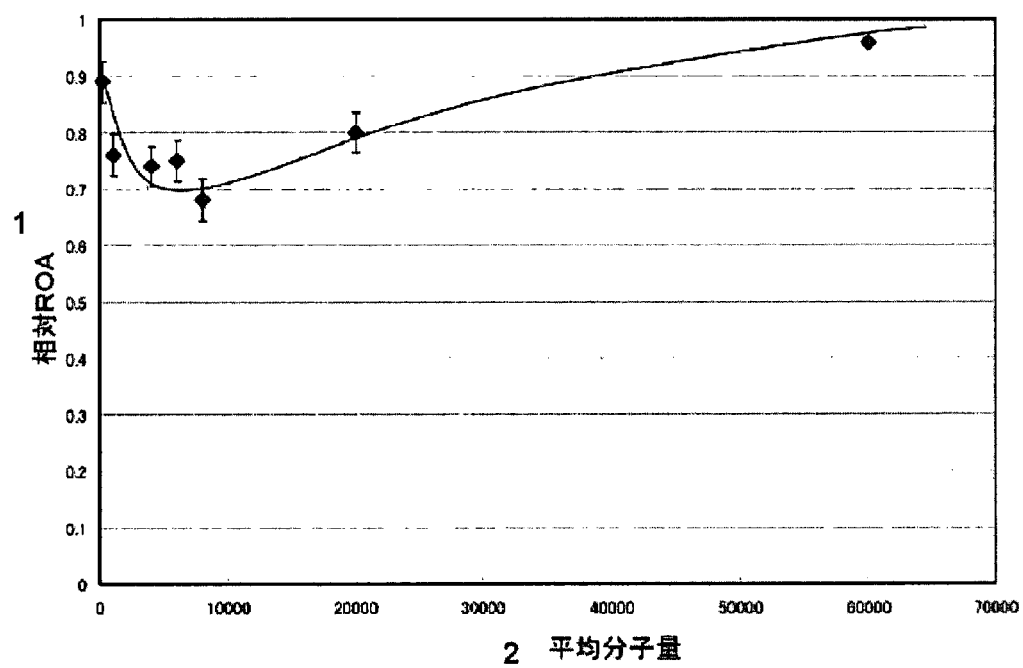
FIG. 6 is a diagram showing the ROA improvement based on differences in the molecular weights of PEG and PEO.

FIG. 6 is a plot of the mean molecular weight against the relative ROA measured in the present invention, especially against the relative ROA of PEG/PEO that exhibited pronounced molecular weight dependence. The addition level was 100 ppm in all cases excluding PEG 200. In the case of PEG 200, 450 ppm was used. As shown in FIG. 6, polyoxyalkylene oxide-based water soluble polymers exhibited a tendency to improvement of the relative ROA with increase in the molecular weight from PEG 200.

In addition, the effect becomes massive accompanying increase in the mean molecular weight, and the improvement in the relative ROA was found to decrease with increase in the mean molecular weight. Furthermore, the results shown in FIG. 6 indicated the figure to be 100 ppm, excluding PEG 200. The relative ROA tended to improve corresponding to increase in the addition level, as shown in FIG. 5.

Consequently, a polyoxyalkylene oxide, referenced as PEG, PEO, PPG, PPO that contain hetero atoms in the main-chain structure are preferably be used in the present invention. The ROA tends to deteriorate if the molecular weight falls excessively, or if the molecular weight rises excessively (when polyoxyalkylene oxide is used in the present invention). Furthermore, when the molecular weights of the tail constituents at both sides of the polymers are considered, the mean molecular weight should be in the range of 200 to 110,000, preferably 1000 to 60,000. From the perspective of stabilization of ROA improvement, the range preferably would be 1000 to 40,000.

Furthermore, great molecular weight dependence is not seen when the water soluble polymer used in the present invention does not contain hetero atoms in the main-chain structure or when hetero atoms are contained in the side-chain structure. The molecular weight of water soluble polymers that do not contain hetero atoms in the side chain could range from a mean molecular weight of 20 to about 3,000,000. The mean molecular weight in the present invention signifies the value derived by known methods of measuring the molecular weight, such as the weight average molecular weight, number average molecular weight, or degree of polymerization.

Concrete examples of water soluble polymers that can be used in the present invention include poly-N-vinylpyrrolidone, poly-N-vinyl acetamide, poly-N-vinylmethyl acetamide, the polyoxyalkylene oxide polymers PEG or PEO as well as PEO-PPO copolymers, e.g. with mean molecular weight of about 200 to 110,000, poly-2-ethyloxazoline or a mixture thereof, but the present invention is not restricted to these.

The level of water soluble polymer in the slurry composition in the present invention can be in the range of 1 ppm (0.001% by mass) to 5000 ppm (0.5% by mass). A range of 10 ppm to 1000 ppm is preferable from the perspective of protection properties and edge polishing properties based on rheology/morphology. A range of 50 ppm to 1000 ppm would be more preferable as other adjustments of the slurry composition may be unnecessary. Furthermore, as there are cases of ROA deterioration with water soluble polymers whose SP value is near the critical maximum level, SP values of 12 to 13.9, the preferred range should be 50 ppm to no more than 200 ppm.

The slurry composition pursuant to the present invention may also contain one or more polishing constituents and/or agents such as an acid or alkali, buffer agent, catalyst, or a salt(s), usually in addition to the water soluble polymer. The polishing agent used in the present invention can be a polishing agent that is commonly used for polishing. Permissible examples of polishing agents include a metal, metal-or metalloid carbide, nitride, oxide, boride and/or diamond.

The polishing agents that can be used in the present invention would usually be those that can polish a substrate surface without inducing harmful scratches (damage) or other defects. Metal oxides are desirable polishing agents. Examples comprise alumina, silica, titania, ceria, zirconia, and magnesia, as well as products co-formed from these, or a mixture thereof (as well as chemical mixtures thereof). Typically, polishing agents comprise alumina, ceria, silica, zirconia or a combination of these. Silica, especially colloidal silica and ceria, are preferred polishing agents, and colloidal silica even more preferred.

The slurry composition pursuant to the present invention may have the polishing agent dispersed in a liquid carrier. Various types of additives such as water soluble polymer can be (first) added, followed by forming a dispersion or suspension. Preferred liquid carriers include polar solvents, preferably water or aqueous media. When the polishing agent is incorporated in slurry, the content should exceed 0.1% by mass, preferably a range of 5 to 50% by mass. In still more preferable slurry compositions, the polishing agent should have 8 to 50% by mass of colloidal silica added.

The optimum pH of the slurry composition of the present invention can be adjusted considering the polishing rate. In the present invention, the pH of the composition should be in the range of 5 to 12. In polishing treatment of silicon wafers, the pH can be in the range of 7 to 12.

The mean particle diameter of the primary particles of the polishing agent can be in the range of 0.01 to 3 μm, preferably 0.01 to 0.8 μm, and most preferably 0.02 to 0.5 μm, e.g. from the perspective of enhancing the polishing rate. Furthermore, when secondary particles are formed through aggregation of primary particles, the mean particle diameter of the secondary particles should be in the range of 0.02 to 3 μm, preferably 0.05 to 1.5 μm, most preferably 0.1 to 1.2 μm, e.g. from the perspective of enhancing the polishing rate and of reducing the surface roughness of the polished material. The mean particle diameter of primary particles of polishing agent could be found through measurement of the particle diameter by image analysis under transmission electron microscope or under scanning electronic microscope. In addition, the mean particle diameter of the secondary particles could be measured as the volumetric mean particle diameter using the laser diffraction method.

Various other additives could be used in the present invention. Desirable additives could achieve high polishing selectivity concerning only silicon dioxide. Examples include an amine, ammonium salt, alkali metal ion, film forming agent, complexing agent, surfactant, rheology-control agent, polymer stabilizer or dispersant and/or halogen ions, as incorporated in polishing systems. Additives could be incorporated in polishing systems at any concentrations desired.

Amine compounds may be added to slurry compositions. Amine compounds may comprise aliphatic amines, cyclic amines, heterocyclic amines, aromatic amines, polyamines or combinations thereof. Desirable forms of amine compounds include amino acids or amino alcohols, compounds that contain at least one oxygen atom and at least one polar moiety. Concrete examples include dimethylpropanolamine (known as 2-dimethylamino-2-methyl-1-propanol or DMAMP), 2-amino-2-methyl-1-propanol (AMP), 2-(2-aminoethylamino)ethanol, 2-(isopropylamino)ethanol, 2-(methylamino)ethanol, 2-(diethylamino)ethanol, 2-(2-(dimethylamino)ethoxy)ethanol, 1,1'-[[3-(dimethylamino)propyl]imino]-bis-2-propanol, 2-(butylamino)ethanol, 2-(tert-butylamino)ethanol, 2-(diisopropylamino)ethanol, N-(3-aminopropyl)morpholine or a mixture thereof.

When adding amine compounds to the slurry composition, the concentration should exceed 0.2 M, and preferably should be added to the slurry composition at a higher concentration. Ammonium salts could be added in addition to amine compounds in the present invention. Examples that could be used include hydroxylated amines (for example, tetramethylammonium hydroxide, TMAH) and quaternary ammonium compounds.

Alkali metal ions may be incorporated in the slurry composition as counter ions of various types of salts. Desirable alkali metal ions include base metal ions of group I from the periodic table. Comparative examples of alkali metal ions that could be used include sodium ions, potassium ions, rubidium ions, and cesium ions. Potassium ions and cesium ions would be preferable, and potassium ions would be especially preferable.

Alkali metal ions could be added to the slurry composition at a level exceeding 0.15 M. Preferably, alkali metal ions could be added at a concentration ranging from 0.25 M to 1.5 M. Anticorrosive additive could be used in the present invention with the polishing system.

Permissible examples of anticorrosive additives include alkyl amine, alkanol amine, hydroxyl amine, phosphoric ester, sodium laurate, fatty acids, polyacrylate, polymethacrylate, polyvinyl phosphonate, polymalate, polystyrene sulfonate, polyvinyl sulfonate, benzotriazole, triazole, benzimidazole and mixtures thereof.

Chelates can be added as desired to the slurry composition in the present invention. Permissible chelating agents include carbonyl compounds such as acetyl acetonate; carboxylic acid salts such as acetates or aryl carbonates; carboxylic acid salts containing at least one hydroxyl group typified by glycolates, lactates, gluconates, gallates, or salts thereof; dicarboxylates, tricarboxylates as well as polycarboxylates (typified by oxalates, phthalates, citrates, succinates, tartrates, malates, edetates such as disodium EDTA), as well as mixtures thereof. Desirable chelating agents include dialcohols such as ethylene glycol, pyrocatechol, pyrogallol, tannic acid as well as trialcohols, polyhydric alcohols and compounds containing phosphates.

One or more surfactants, viscosity regulators, and/or coagulants can be used, as desired, in the polishing system pursuant to the present invention. Desirable viscosity regulators include urethane polymer and acrylates containing at least one acrylic unit. Comparative examples of viscosity regulators include low-molecular-weight carboxylates and high-molecular-weight polyacrylamide compounds. Desirable surfactants include cationic surfactants, anionic surfactants, anionic polymer electrolytes, nonionic surfactants, amphoteric surfactants, fluorinated surfactants, and mixtures thereof.

The substrate can be polished by polishing systems furnished with appropriate polishing pads. Woven or nonwoven polishing pads would preferably be used as the polishing pads. Concrete examples of desirable polishing pads include polishing pads furnished with polymers. Desirable polymers include polyvinyl chloride, polyvinyl fluoride, nylon, carbon fluoride, polycarbonate, polyester, polyacrylate, polyether, polyethylene, polyamide, polyurethane, polystyrene, polypropylene, co-formed products thereof as well as their mixtures.

In addition, the slurry composition and substrate polishing method pursuant to the present invention may be applied to other substrates (that allow or need polishing treatment) such as a polysilicon film and silicon substrate that has an $SiO_2$ film formed in addition to silicon substrates. Furthermore, the slurry composition may be calibrated in advance and the method of polishing with a polishing pad while supplying a slurry composition to the polished substrate following calibration may be employed in addition to the so-called in-situ preparation-calibration method that employs calibration of the slurry composition for substrate polishing near the polishing pad following provision of slurry base solution onto the polishing pad.

The present invention has been explained in detail hitherto, and the present invention will be explained in further detail below through concrete embodiments. The embodiments presented below are for the purpose of clarifying the present invention. It is to be understood that these embodiments do not constitute any limitation on the present invention.

EXAMPLES AND PREFERRED EMBODIMENTS

Slurry compositions pursuant to the present invention were formulated by adding a plurality of water soluble polymers to slurry solution. The polishing rate and ROA were then measured. Preparation of the slurry composition and the wafer polishing conditions are presented below.

1. Preparation of Slurry Compositions

A slurry composition containing 1.2% by mass colloidal silica and water at pH 10.5 was formulated by adding thereto 50 ppm to 600 ppm of poly-N-vinylpyrrolidone (K15, K30, K60, K120, made by Nippon Shokubai Co., Ltd.), poly-N-vinyl acetamide (made by of Showa Denko K.K., GE191-053, -103, -104, -107), PEG 200 (made by of NOF Corporation, PEG 200P), PEG 1000 (made by NOF Corporation, PEG 1000P), PEG 4000 (made by NOF Corporation, PEG 4000P), PEG 6000 (made by NOF Corporation, PEG 6000P), PEG 8000 (Sigma Aldrich, mean molecular weight 8000), PEO 60,000 (ALKOX L-6, made by Meisei Chemical Works, Ltd.), PEO 110,000 (ALKOX L-11, made by Meisei Chemical Works, Ltd.) PEG-PPG block copolymer (Pluronic F-108, mean molecular weight 14,500, made by Adeka corporation), poly-2-ethyloxazoline (made by Alfa Aesar, poly(2-ethyl-2-oxazoline, molecular weight 200, 000), polyvinyl alcohol (made by Nippon Synthetic Chemical Industry Co., Ltd., G-polymer, OKS 8049 and made by Nippon Synthetic Chemical Industry Co., Ltd., Gosenol NL-05). Table 1 presents the individual water soluble polymers used as well as abbreviations in the specification.

TABLE 1

| 1 水溶性高分子 | 2 実施例中の表記 |
|---|---|
| PVA OKS8049 | 2VA(OKS) |
| PVA Mw, 20 k | PVA20 k |
| PVP K50 | PVP |
| PVPK15 | PVPK15 |
| PVPK60 | PVPK60 |
| PVPK30 | PVPK30 |
| PVP K120 | PVPK120 |
| Poly (2-ethyl) oxozoline Mw, 200 k | P2EOx |
| Poly (2-ethyl) oxozoline Mw, 500 k | P2EOx500 k |
| PNMVA Mw, 10 k | PNMVA |
| PEG200 | PEG200 |
| PEG1000 | PEG1000 |
| PEG4000 | PEG4000 |
| PEG4000 | PEG6000 |
| PEG 8000 | PEG8000 |
| PEO 11000 | PEO11000 |
| PEO 20000 | PEO20000 |
| PEG Mw, 60 k | PEG60 k |
| PEG Mw, 110 k | PEG110 k |
| Fluroric F-108 | PEG-Black |
| PNVA GE191-103 | PNVA(1) |
| PNVA GE191-104 | PNVA(2) |

Key
(1) water soluble polymer
(2) notation in embodiment

2. Polishing Conditions

Silicon wafers were subjected to polishing treatment under the following conditions using the slurry compositions formulated in section 1.

(1) Polishing apparatus: 6-inch sheet-style single-side polisher manufactured by Logitech Ltd. of the U.K. 1CM52

(2) Polishing pressure: 2 psi=140 g/cm$^2$=13.8 kPa
(3) Table speed: 30 rpm
(4) Carrier speed: 11 rpm
(5) Slurry feed level: 150 mL/min
(6) Polishing duration: 15 min
(7) Silicon wafer (6 inch diameter, p type, resistivity 0.1-100 Ω-cm)

The ROA was measured using a needle-type profiler (P16 made by KLA Tencor Corporation). The relative ROA was found by standardization of the ROA following treatment of the silicon wafer used with the ROA during polishing with a slurry composition lacking water soluble polymer. In addition, the polishing rate was found by dividing the weight difference of the silicon wafer before and after polishing treatment by the silicon wafer area. Example 40 in FIG. 4 denotes the value measured without the addition of water soluble polymer. A baseline was found independently of the individual characteristics of the silicon wafers that were used.

Mirror-surface polishing of silicon wafers was carried out under the polishing conditions presented above using various slurry compositions. The mean polishing rate RR of the entire silicon wafer as well as the difference in the ROA values before and after polishing were found. The relative ROA was found as the ratio of those figures versus the reference value in the absence of water soluble polymer.

The results are presented in Table 2 and Table 3 below. Examples 1 to 43 represent embodiments while Examples 44 to 51 represent comparative examples. The results of Table 2 and Table 3 indicate that the amount of decline in the RR measured in Example 1 to Example 43 (embodiments) was 0.860 on average. On the other hand, the amount of decline in the RR measured in Example 44 to Example 51 (comparative examples) was 0.923 on average. Specifically, the embodiments exhibited enhancement affinity with the silicon wafer surface with regard to the RR. Conversely, the mean relative ROA derived in the embodiments of Example 1 to Example 43 was 0.750 while the mean relative ROA derived in Example 44 to Example 51 (comparative examples) was 0.971. This indicates that the relative ROA was significantly improved, surpassing the RR decrease rate, as a result of the presence of water soluble polymer in the embodiments. This indicates that the slurry composition pursuant to the present invention has a selective polishing protective property at the edge region.

A slurry composition capable of selectively reducing the polishing rate at the edge boundary region of silicon wafers can be provided in the present invention, as indicated above. A slurry composition and a method of silicon wafer polishing capable of reducing the manufacturing costs through such roll-off improvements in mirror-surface polishing of silicon wafers and capable of enhancing the yield can be provided.

TABLE 2

| 1 例 | 2 水溶性高分子 | Conc.(ppm) | 3 RR 相対値 | 4 ROA 相対値 |
|---|---|---|---|---|
| 1 | PNVA(1) | 100 | 0.98 | 0.99 |
| 2 | PNVA(1) | 200 | 0.94 | 0.88 |
| 3 | PNVA(1) | 400 | 0.81 | 0.71 |
| 4 | PNVA(1) | 600 | 0.55 | 0.79 |
| 5 | PNVA(2) | 50 | 0.95 | 0.95 |
| 6 | PNVA(2) | 100 | 0.93 | 0.84 |
| 7 | PNVA(2) | 200 | 0.91 | 0.96 |
| 8 | PNVA(2) | 400 | 0.64 | — |
| 9 | PNVA(3) | 200 | 0.86 | 0.93 |
| 10 | PNVA(3) | 400 | 0.83 | 0.66 |

TABLE 2-continued

| 例 | 水溶性高分子 | Conc.(ppm) | RR 相対値 | ROA 相対値 |
|---|---|---|---|---|
| 11 | PNVA | 600 | 0.93 | 0.96 |
| 12 | PNVA | 150 | 0.88 | 0.83 |
| 13 | PNVA | 400 | 0.48 | 0.57 |
| 14 | PNMVA | 200 | 0.88 | 0.67 |
| 15 | PNMVA | 400 | 0.58 | 0.59 |
| 16 | PEG200 | 400 | 0.90 | — |
| 17 | PEG200 | 450 | 0.87 | 0.89 |
| 18 | PEG1000 | 100 | 0.90 | 0.76 |
| 19 | PEG4000 | 100 | 0.91 | 0.74 |
| 20 | PEG6000 | 100 | 0.92 | 0.75 |
| 21 | PEG8000 | 50 | 0.93 | 0.74 |
| 22 | PEG8000 | 100 | 0.89 | 0.68 |
| 23 | PEG8000 | 200 | 0.83 | 0.41 |
| 24 | PEG11000 | 100 | 0.92 | — |
| 25 | PEO20000 | 150 | 0.89 | 0.80 |
| 26 | P2EOx | 200 | 0.87 | 0.78 |
| 27 | P2EOx500 k | 200 | 0.93 | 0.96 |
| 28 | PEO60K | 100 | 0.90 | 0.96 |
| 29 | PEO60K | 200 | 0.82 | 0.62 |
| 30 | PEO60K | 400 | 0.52 | 0.65 |
| 31 | PEO110K | 100 | 0.91 | 0.95 |

Key
(1)Example
(2)water soluble polymer
(3)relative RR value
(4)relative ROA value

TABLE 3

| 例 | 水溶性高分子 | Conc.(ppm) | RR 相対値 | ROA 相対値 |
|---|---|---|---|---|
| 32 | PEO110K | 200 | 0.84 | 0.63 |
| 33 | PEO110K | 400 | 0.62 | 0.65 |
| 34 | PEO-Block | 100 | 0.92 | 0.64 |
| 35 | PEO-Block | 200 | 0.85 | 0.70 |
| 36 | PEO-Block | 400 | 0.69 | 0.54 |
| 37 | PVP | 200 | 0.90 | 0.91 |
| 38 | PVP | 300 | 0.84 | 0.71 |
| 39 | PVP | 400 | 0.72 | 0.56 |
| 40 | PVPK15 | 150 | 0.92 | 0.95 |
| 41 | PVPK30 | 200 | 0.91 | 0.87 |
| 42 | PVPK60 | 200 | 0.92 | 0.95 |
| 43 | PVPK120 | 250 | 0.93 | 0.76 |
| 44 | PVA20K | 100 | 0.95 | 0.97 |
| 45 | PVA20K | 200 | 0.93 | 0.94 |
| 40 | PVA20K | 400 | 0.88 | 0.91 |
| 47 | PVA200K | 400 | 0.92 | 1.00 |
| 49 | PVA(OKS) | 200 | 0.94 | 1.00 |
| 40 | PVA(OKS) | 400 | 0.90 | 1.07 |
| 50 | PVA(OKS) | 600 | 0.86 | 0.88 |
| 51 | None | — | 1.00 | 1.00 |

Same key as Table 2.

The present invention provides a wafer polishing technology capable of increasing the effective usable area of silicon wafers, of improving the production yield of semiconductor equipment, of enhancing the production efficiency of semiconductor equipment, and of reducing manufacturing costs by improving the ROA of silicon wafers by merely altering the slurry composition without significantly altering the wafer polishing conditions.

Explanation of Notations

100 CMP apparatus
102 sun gear
103 carrier
104 silicon wafer
105 polishing pad
106, 107 disc
108 internal gear
109, 301 slurry composition
201 base line
301 slurry composition
302 edge section

The invention claimed is:

1. A chemical-mechanical polishing composition comprising a polishing agent, and a water soluble polymer having a mean molecular weight of about 200 to about 3,000,000 that has a solubility parameter (SP) in the range of 9.0 to 14.0, wherein the water soluble polymer has one or more hetero atoms.

2. The composition of claim 1 in which the mean molecular weight of the water soluble polymer is about 200 to 110,000.

3. The composition of claim 1 in which the water soluble polymer is present at about 1 ppm to about 1,000 ppm.

4. The composition of claim 1 in which the water soluble polymer is present at about 1 ppm to about 600 ppm.

5. The composition of claim 1 in which the water soluble polymer is present at about 1 ppm to about 400 ppm.

6. The composition of claim 1 in which the water soluble polymer is present at about 1 ppm to about 200 ppm.

7. The composition of claim 1 in which the amount of the water soluble polymer is not more than 200 ppm and the water soluble polymer has a solubility parameter in a range of 12 to 13.9.

8. The composition of claim 1 in which the water soluble polymer comprises a polyoxyalkylene oxide (such as PEG, PEO, PPG, PPO), poly-N-vinylpyrrolidone, poly-N-vinyl acetamide, poly-N-methylvinyl acetamide poly-2-ethyloxazoline, or a mixture thereof.

9. The composition of claim 1 wherein the pH of the composition is from about 7 to about 12.

10. A method of polishing a substrate, comprising: contacting, or adhering to, the substrate a composition comprising a polishing agent, and a water soluble polymer having a mean molecular weight of about 200 to about 3,000,000 that has a solubility parameter (SP) in the range of 9.0 to 14.0, wherein the water soluble polymer has one or more hetero atoms.

11. The method of claim 10 in which the water soluble polymer is present at a level of 1 ppm to 1000 ppm.

12. The method of claim 10 in which the mean molecular weight of the water soluble polymer is in the range of 200 to 110,000 and the SP value is under 9.5.

13. The method of claim 10 wherein the substrate comprises a silicon substrate such as a polysilicon film or silicon wafer.

* * * * *